United States Patent
Nanda et al.

(10) Patent No.: US 10,655,945 B2
(45) Date of Patent: May 19, 2020

(54) METHODS AND APPARATUS TO COORDINATE MOVEMENT OF AUTOMATED VEHICLES AND FREIGHT DIMENSIONING COMPONENTS

(71) Applicant: SYMBOL TECHNOLOGIES, LLC, Lincolnshire, IL (US)

(72) Inventors: Chinmay Nanda, Port Jefferson Station, NY (US); Richard Mark Clayton, Manorville, NY (US)

(73) Assignee: Symbol Technologies, LLC, Holtsville, NY (US)

(\*) Notice: Subject to any disclaimer, the term of this patent is extended or adjusted under 35 U.S.C. 154(b) by 0 days.

(21) Appl. No.: 15/653,889

(22) Filed: Jul. 19, 2017

(65) Prior Publication Data
US 2019/0025852 A1 Jan. 24, 2019

(51) Int. Cl.
| | | |
|---|---|---|
| G06T 7/62 | (2017.01) | |
| H04N 13/106 | (2018.01) | |
| G01B 11/00 | (2006.01) | |
| B66F 9/06 | (2006.01) | |
| B65G 1/06 | (2006.01) | |
| B65G 1/137 | (2006.01) | |
| G01B 11/02 | (2006.01) | |
| G01B 11/25 | (2006.01) | |
| G01N 9/02 | (2006.01) | |
| G05B 15/02 | (2006.01) | |
| G05B 19/418 | (2006.01) | |

(Continued)

(52) U.S. Cl.
CPC .............. *G01B 11/00* (2013.01); *B65G 1/065* (2013.01); *B65G 1/1378* (2013.01); *B66F 9/063* (2013.01); *G01B 11/02* (2013.01); *G01B 11/026* (2013.01); *G01B 11/2513* (2013.01); *G01N 9/02* (2013.01); *G05B 15/02* (2013.01); *G05B 19/4189* (2013.01); *G05B 19/41895* (2013.01); *G05D 1/0274* (2013.01); *G06K 9/62* (2013.01); *G06Q 10/08* (2013.01); *G06Q 10/087* (2013.01); *G06T 7/62* (2017.01); *H04N 13/106* (2018.05); *G05D 2201/0216* (2013.01)

(58) Field of Classification Search
CPC ..... G05B 19/41895; G06T 7/62; G01B 11/00; H04N 13/106
See application file for complete search history.

(56) References Cited

U.S. PATENT DOCUMENTS

| | | | | |
|---|---|---|---|---|
| 6,611,787 B2 * | 8/2003 | Stringer | ................. | G01B 11/00 702/156 |
| 7,757,946 B2 * | 7/2010 | Kienzle-Lietl | ........... | G01G 9/00 235/383 |

(Continued)

*Primary Examiner* — Thomas Randazzo
(74) *Attorney, Agent, or Firm* — Yuri Astvatsaturov

(57) ABSTRACT

A method and apparatus for dimensioning an object carried by an automated pallet mover is disclosed. An example includes an image sensor configured to capture image data representative of a dimensioning area. A dimensioning coordinator is remotely located from an automated transportation system capable of moving the automated pallet mover. The dimensioning coordinator detects a dimensioning trigger condition associated with the pallet mover and sends first instructions to the automated transportation system to move the vehicle to the dimensioning area, and second instructions to coordinate movement of the vehicle and image capture operation to perform dimensioning on the object.

22 Claims, 11 Drawing Sheets

(51) Int. Cl.
  *G05D 1/02*  (2020.01)
  *G06K 9/62*  (2006.01)
  *G06Q 10/08*  (2012.01)

(56) References Cited

U.S. PATENT DOCUMENTS

| | | | |
|---|---|---|---|
| 9,415,935 B1* | 8/2016 | Macfarlane | B65G 1/1373 |
| 9,505,554 B1* | 11/2016 | Kong | H04N 5/23212 |
| 9,555,978 B1* | 1/2017 | Hanssen | B65G 1/1378 |
| 9,898,833 B1* | 2/2018 | Jankevics | G06T 7/62 |
| 2001/0041948 A1* | 11/2001 | Ross | G06Q 10/08 |
| | | | 700/226 |
| 2010/0179691 A1* | 7/2010 | Gal | F41H 7/005 |
| | | | 700/259 |
| 2011/0218670 A1* | 9/2011 | Bell | B66F 9/0755 |
| | | | 700/215 |
| 2012/0123614 A1* | 5/2012 | Laws | G05B 19/4189 |
| | | | 701/2 |
| 2015/0375398 A1* | 12/2015 | Penn | G06Q 10/083 |
| | | | 700/218 |
| 2017/0169672 A1* | 6/2017 | Farrow | G06K 7/10366 |
| 2017/0227629 A1* | 8/2017 | Sorensen | G01G 19/083 |
| 2017/0228885 A1* | 8/2017 | Baumgartner | G01B 11/04 |
| 2017/0280125 A1* | 9/2017 | Brown | B65G 1/00 |
| 2017/0286907 A1* | 10/2017 | Rizkallah | G06Q 10/0875 |
| 2018/0168141 A1* | 6/2018 | Tanner | B25J 9/1679 |

\* cited by examiner

METHODS AND APPARATUS TO COORDINATE MOVEMENT OF AUTOMATED VEHICLES AND FREIGHT DIMENSIONING COMPONENTS

BACKGROUND

Freight dimensioning systems are often employed in storage and shipping operations to assist with logistics and operations. Personnel can use these systems to measure freight dimensions for objects as a way of, for example, validating a manufacturer's declared dimensions for the objects. These freight dimensioning systems may also be used to properly determine shipping costs to deliver objects to customers. Measured freight dimensions can also be used to plan for more efficient placement of objects in storage areas and in shipping containers, providing a mechanism for optimizing space utilization.

DETAILED DESCRIPTION

Figure 1:
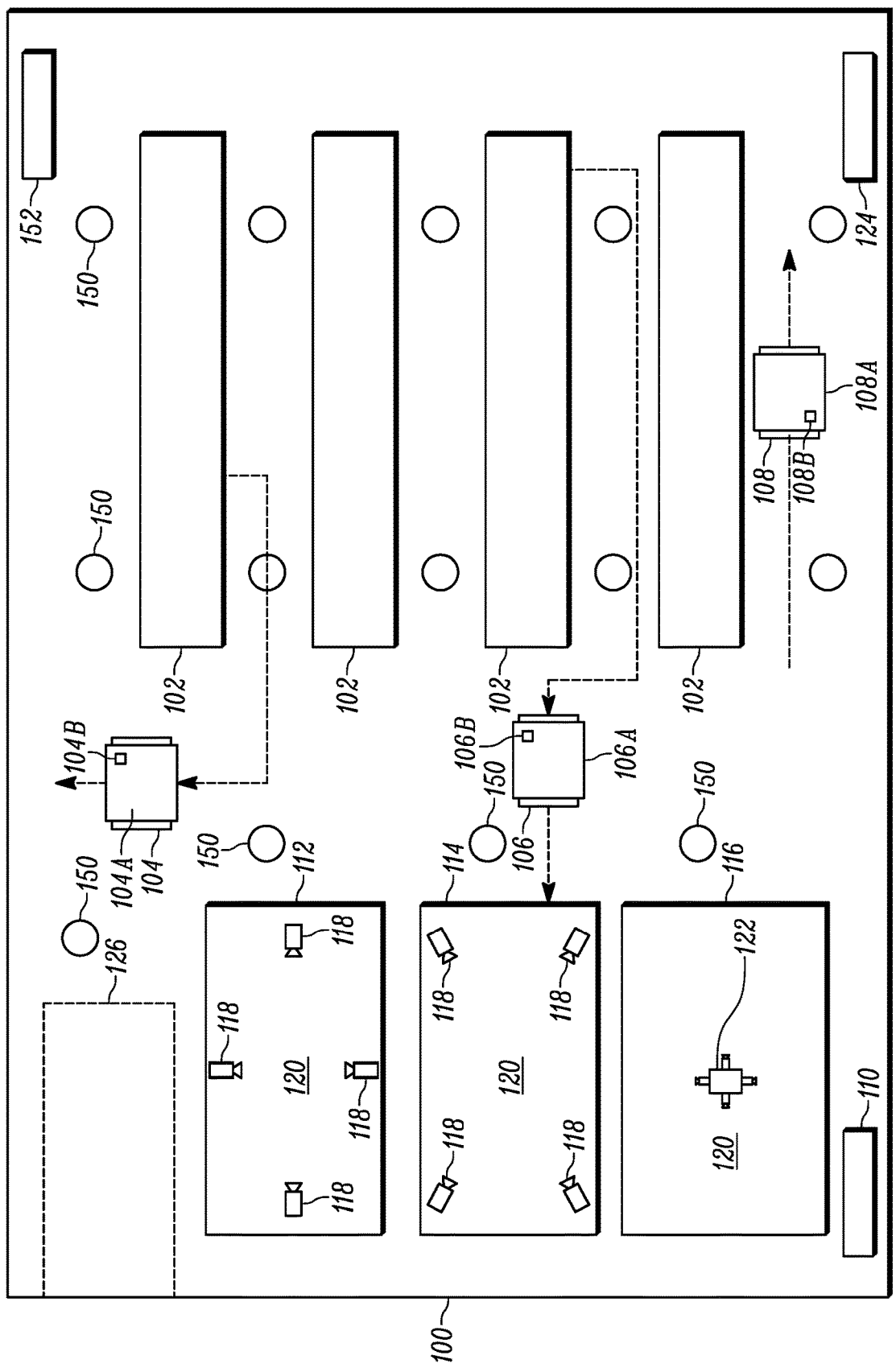
FIG. 1 depicts an example warehouse environment having automated freight transportation and automated freight dimensioning, in accordance with teachings of this disclosure.

Advancements in communication technology, such as Internet-based purchasing and ordering, have increased the number of consumers and enterprises that rely on accurate and timely delivery of goods and materials. In turn, demands on those tasked with providing such services have amplified. In addition to greater volumes of packages to be delivered, allotted delivery times have shortened to meet demand as the transportation and logistics industry grows and competition intensifies. Moreover, many entities operate under guarantees in terms of accurate and timely delivery of packages, thereby heightening the importance of accurate and timely performance.

To meet these and other challenges, transportation and logistics entities seek improvements across different aspects of operations. For example, some companies utilize automated vehicles in warehouse and shipping environments to expedite movement of goods, produce, boxes, and other types of objects. These automated or semi-automated vehicles, such as robotic platforms that move boxes or pallets, move objects from one location to another under the control of a machine. For example, when a customer orders an object, an automated transportation system may receive an identification of the object and transaction information associated with the order. The automated transportation system, in communication with a warehouse inventory management system, may determine the location of the object and instruct an automated vehicle to navigate to the location. The object is placed on the automated vehicle, which is programmed to or controlled to move the object from a storage area in the warehouse to, for example, a shipping area for shipping to the customer.

In some examples, objects to be shipped are brought to a dimensioning stage before being loaded (e.g., onto a delivery truck trailer). A dimensioning stage determines or obtains one or more characteristics of the object such as, for example, a weight of a package, a shape of package, and/or one or more dimensions of a package. The process of measuring or obtaining one or more dimensions of an object, such as a package, is sometimes referred to as dimensioning. To reduce the time taken to dimension objects, some systems utilize machines, such as scanners and/or image capture devices, to dimension the object. For example, the object to be dimensioned is placed in the dimensioning stage and image capture device(s) generate image data (e.g., a point cloud) representative of the objects. The image data is processed to obtain dimensions of the object.

Examples disclosed herein provide a dimensioning system that interfaces with and, at least partially, controls an automated transportation system to achieve faster, more accurate dimensioning of objects within an environment. While not limited, example environments herein include shipping facilities, warehouses, and other areas where automated transportation vehicles may be implemented. Example automated vehicles, which may alternatively be termed driverless vehicles, robotic vehicles, or self-driving vehicles, include automated platforms, such as automated pallet movers, and automated forklifts. As used herein, the term automated vehicle includes, but is not limited to, automated or semi-automated vehicles configured to move through an environment under the control of one or more computers without human control. The computer controlling the automated vehicle may be a remote computer communicating with the automated vehicle over a wireless communication. Additionally or alternatively, the computer controlling the automated vehicle may be on board the automated vehicle.

Example methods and apparatus disclosed herein coordinate movement of automated vehicles with a dimensioning system to efficiently and accurately dimension objects being carried by automated vehicles. As described in detail below, examples disclosed herein change the automated vehicles from a normal operating mode to a dimensioning mode.

In examples disclosed herein, in the normal operating mode, automated vehicles move throughout a venue under control of, for example, a centralized transportation controller of an automated transportation system. The automated vehicles are autonomous, in that they do not need a human operator to move. Instead, the centralized transportation controller provides instructions to the automated vehicles to control movement of the vehicles. An example automated vehicle is an automated pallet mover, or computer controlled robotic platform, used in warehouse facilities to move one or more objects from one location to another.

In examples disclosed herein, the dimensioning system initiates switching of the automated vehicle from the normal operating mode to the dimensioning mode. As part of that initiation, the dimensioning system communicates with the centralized transportation controller sending instructs for the automated vehicle to enter a dimensioning stage, which is configured to determine the dimensions and/or shape of one or more objects transported by the automated vehicle.

To initiate the dimensioning mode, the dimensioning system may, in some example embodiments, determine when a triggering event has occurred and, in response, send an electronic request (or instruction) to the centralized transportation controller. Upon receipt of the request, the centralized transportation controller reviews the request and sends an instruction to the automated vehicle to enter the dimensioning mode and to move to the dimensioning stage. While, in various examples herein, the dimensioning system is described as separate from the automated transportation system, in other examples, the dimensioning and automated vehicle operations described herein may be wholly or partially integrated together into a centralized controller.

The dimensioning system communicates with the centralized transportation controller through a communication network, such as a wireless network. In examples disclosed herein, the dimensioning system sends instructions in the form of formatted data or commands that request the automated vehicle enter a dimensioning mode. The automated vehicle then enters the dimensioning mode, in which the automated vehicle receives additional information and/or instructions from the dimensioning system in response to which freight carried by automated vehicle then dimensioned by the dimensioning system. As used herein, "freight" refers to any single object of interest being carried by an automated vehicle or to multiple objects being carried by an automated vehicle and that is/are to be dimensioned. In the case of multiple objects, the dimensioning system may dimension the objects together, as might be done, for example, for objects that are to be shipped together to a customer, all at once. Of course, in some examples, the dimensioning system may dimension multiple objects individually even though those objects are carried on the same automated vehicle.

In some example embodiments, the dimensioning system sends different data packets to control the operation of the automated vehicle operating in the dimensioning mode.

In some examples embodiments, the data packets may include position instructions that instruct the automated vehicle where the assigned dimensioning stage is, so that the automated vehicle will take the freight to the assigned station.

In some examples herein, the data packets may include dimensioning stage instructions that instruct the automated vehicle how to operate within the dimensioning stage. For example, dimensioning stage instructions may include instructions indicating directions of movement and paths of movement that the automated vehicle is to perform for dimensioning. These instructions may also include the order in which different movements are to be performed or different paths are to be taken. These instructions directing automated vehicle movement are coordinated with the dimensioning process and, as such, are designed to increase the accuracy and speed with which dimensioning is performed.

Furthermore, the dimensioning stage instructions may be determined based on characteristics of the dimensioning stage, such as the number and position of image sensors in the dimensioning stage. The dimensioning stage instructions may be determined based on characteristics of the automated vehicle. The dimensioning stage instructions may be determined based on characteristics of the object. Any combination of these and other characteristics may be used to determine dimensioning stage instructions for moving the automated vehicle. The various dimensioning instructions may include instructions to move on a linear path, to move on a curved path, to rotate within a dimensioning area, to perform a pirouette within the dimensioning area, on the speed of movement of the automated vehicle, on the number of passes the automated vehicle is to make within a dimensioning area, etc.

To facilitate dimensioning, the dimension stage instructions may include instructions to control operation of image capture devices in the dimensioning stage, e.g., image sensors in the dimensioning stage. The instructions may include instructions to change orientation of the image sensors to point the image sensors at the object or objects carried on the automated vehicle. These instructions may include instructions for the image sensors to perform zoom in and/or zoom out operations, thereby adjusting their field of view to capture images. Further still, these image capture instructions are coordinated with automated vehicle instructions to optimize image capture and dimensioning. This coordination, between automated vehicle movement and image capture device operation, may be achieved through instructions that coordinate image capture at different times, along different directions, from different perspectives, etc.

Various object information is obtained and used for determining dimensioning stage instructions. Example object information includes the shape of an object, the weight of an object, one or more dimensions of an object, and the number of objects.

The object information may be determined from a target sensing system that includes a radio frequency identification (RFID) reader. The target sensing may be positioned at dimensioning stage, and the RFID reader may be detected to detect an RFID tag associated with the object. As the automated vehicle enters the dimensioning stage, the RFID reader detects the RFID tag(s), and the target sensing system obtains the object information associated with the RFID tag(s), which is then communicated to the dimensioning system. In other examples, the automated transportation system stores the object information and communicates it to the dimensioning system.

In example embodiments, the dimension stage instructions may be adjusted dynamically, e.g., during measurements of the object within a dimensioning area. For example, an object's true size or shape may differ from that of the information stored for the object. Or, the position of the object on the automated vehicle may be different from that assumed by the dimensioning system. Therefore, to account for these errors, the dimensioning system may capture images of the object, determine dimensions of the object, and assess the quality of one or more of those determined dimensions. If the quality of any measurement is below a threshold assurance level, then the dimensioning system may adjust the dimensioning stage instruction.

FIG. 1 depicts an example warehouse environment 100 illustrating an automated transportation system and a dimensioning system for automated dimensioning of freight, which in the illustrated example is an object. The environment 100 may be a shipping warehouse, for example, having storage areas 102 that house objects to be shipped. The storage areas 102 include shelving to store objects in a catalogued manner such that the objects are easily identified, whether by personnel or by automated extractors, when it is time for an object to be retrieved from the storage areas 102. In the example of personnel, an employee may be notified that an order has been placed by a customer requiring shipment of a particular object. A shipping control system, not shown, may provide an instruction to the employee (e.g., via a handheld computer, data assistant, mobile device, etc.) instructing the employee on which object to remove from the storage area 102, by identifying the location of the object in the storage area. In the example of an automated extractor, a shipping control system may send object location information to an automated transportation system that instructs an automated vehicle to move to the location of the object and that instructs a computer controlled extractor to remove the object from the storage area 102 and place it on the automated vehicle.

In either example, once an object of interest has been removed from the storage area 102 and placed on an automated vehicle, the automated vehicle, operating in a normal operating mode, transports the object to an identified location within the environment 100. In the illustrated example, a plurality of automated vehicles 104-108 is shown operating within the environment 100. The automated vehicles are automated pallets movers, each carrying as freight an object of interest 104A, 106A, and 108A, respectively.

A dimensioning stage manager 110 (an example dimensioning stage controller) is communicatively coupled to each of a plurality of dimensioning stages 112, 114, and 116, three of which are shown for example purposes. The dimensioning stage manager 110 may be connected to the dimensioning stages 112-116 via wired or wireless network connection and configured to control image capture devices (e.g., image sensors) in the dimensioning stages 112-116 and for determining dimensions of objects of interest taken to the dimensioning stages 112-116 by, for example, the automated vehicles 104-108.

In the illustrated example, dimensioning stages 112 and 114 are similar in that both comprise a plurality of image sensors 118. While not limiting, in the illustrated example, four image sensors 118 are shown in each dimensioning stage 112 and 114, with the stages differing in the orientation of the image sensors with respect to a dimensioning area 120. In some examples, the image sensors 118 are fixedly mounted, although in some examples, the image sensors 118 are movable. The image sensors 118 are controlled by the dimensioning stage manager 110 to capture images of an object for dimensioning, as further described herein. In contrast to dimensioning stages 112 and 114, the dimensioning stage 116 includes only one image sensor 122, which is movable within the dimensioning stage 116 to capture images of the object, for example, at different orientations or perspectives by moving the image sensor 122 around the object, by tilting, panning or rotating the image sensor 122, by moving the object around the image sensor 122, or by moving both the image sensor 122 and the object in a coordinated manner, while capturing images.

The automated vehicles 104-108 are part of an automated transportation system controlled by a centralized transportation controller 124 that controls movement of the automated vehicles 104-108 from the storage areas 102 to other areas of the environment 100 using position instructions indicating the location of an assigned one of the dimensioning stages 112-116. The centralized transportation controller 124 may communicate with the automated vehicles 104-108, using a wireless protocol.

During a normal operating mode, the automated vehicles 104-108 may be instructed to move from the storage area 102 to a packaging and shipping area 126 for shipping to a customer. Additionally, the normal operating mode includes the automated vehicles 104-108 moving to the storage area 102 to obtain one or more objects. Put another way, when in normal operating mode, the automated vehicles 104-108 perform functions autonomously and independent of the dimensioning operations.

In examples disclosed herein, the dimensioning stage manager 110 communicates with the transportation controller 124 to switch one or more of the automated vehicles 104-108 into a dimensioning mode in which the transportation controller 124 instructs the automated vehicles 104-108 to move to an assigned one of the dimensioning stages 112-116.

The switch between the normal operating mode and the dimensioning mode may be made in response to a triggering event. Triggers may be determined by the dimensioning stage manager 110 or by the transportation controller 124 or by a combination thereof. While not limited, example triggers include a time-based trigger, e.g., such that objects are dimensioned according to a scheduled, periodic time. Other example triggers include, a location-based trigger, where the automated vehicle 104, 106, or 108 is instructed to enter a dimensioning mode when the automated vehicle 104, 106, or 108 is determined to be at a predetermined position or proximity to a location. In example embodiments, the trigger may be based on a time value, e.g., where automated vehicles are instructed to enter the dimensioning mode at different times or according to a schedule. In some examples, the triggering event may be a location value, such as when an object is identified at a predetermined location. Proximity to a dimensioning stage may be another triggering event. Various systems may be used to identify when triggers occur, including RFID based systems, Light Detection and Ranging (LIDAR) based systems, and systems that identify automated vehicle fiducials.

FIG. 1 further illustrates a target sensing system that is configured to identify freight being transported in the system, e.g., to identify objects and object information that may be used for triggering, as well as for determining dimensioning stage instructions (e.g., instructions to control movement of the automated vehicles 104-108 and/or instructions to control image capture operations). In the illustrated example, the target sensing system is formed of a plurality of RFID readers 150 (only some of which are numbered) positioned throughout the environment 100 and each communicatively coupled to the target sensing system controller 152. The RFID readers 150 may detect RFID tags associated with objects, such as tags 104B, 106B, and 108B, associated with objects 104A, 106A, and 108A, respectively.

Figure 2:
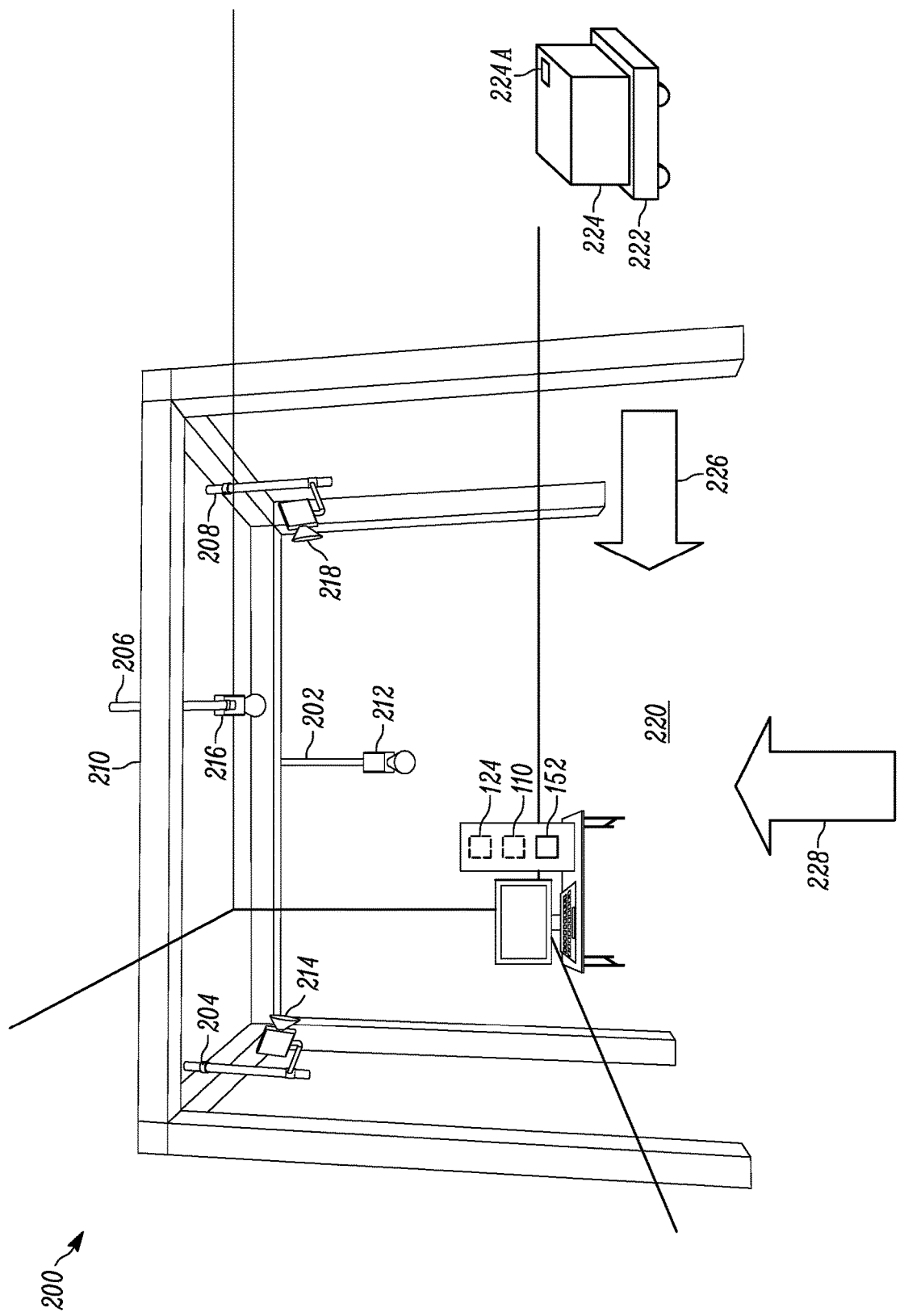
FIG. 2 depicts an example environment including multiple image sensors and a dimensioning system in accordance with teachings of this disclosure.

FIG. 2 illustrates an example dimensioning stage 200 having multiple image sensors controlled by the dimensioning stage manager 110 of FIG. 1, as may be implemented as either dimensioning stage 112 or 114. The dimensioning stage 200 includes a plurality of image sensors, or image capture devices. In some examples, the image sensor is a depth imaging sensor that captures three-dimensional (3D) data representative an object in dimensioning area. Such depth image sensors may be implemented as, for example, 3D cameras (e.g., RGB-D image sensors) capable of applying a 2D matrix to depth measurements. The three-dimensional data can be used to determine dimension(s) of the object, thereby providing data representative of the shape of the object. When determining the dimension(s) of the object, different perspectives of the object are useful to obtain information regarding different surfaces and/or edges of the object. As such, different frames of image data (which each correspond to a particular time) from the differently located depth image sensors are merged together to provide a full view of the object. For the merging of the different frames to accurately represent the object, the frames should truly correspond to a single time, especially when motion is occurring in the scene. In some embodiments, depth image sensors are sensors capable of capturing image data at a high frame rate (e.g., 30 frames per second (fps) or faster). These depth image sensors are examples of fixed frame rate image capture devices. The relative positions and angles of the image sensors are known by the dimensioning stage manager so that the captured image data can be merged together.

The dimensioning stage 200 includes a four imaging stations: north imaging station 202, a west imaging station 204, a south imaging station 206, and an east imaging station 208. In the illustrated example the imaging stations 202-208 are mounted to a frame 210. Alternative examples include any suitable number (e.g., one (1), two (2), three (3), five (5), etc.) of imaging stations deployed in any suitable manner. In some embodiments, the image stations are mounted to the ground (see, e.g., FIGS. 6-9) or to the walls. The terms "north," "west," "south" and "east" are used for ease of reference and not limitation. Each of the imaging stations 202-208 includes an image capture device (also termed an image sensor) 212-218, respectively, capable of capturing color data and depth data in a respective coordinate system. For example, each of the image sensors 212-218 is an RGB-D sensor that generates an RGB value and a depth value for each pixel in a coordinate system. In alternative examples, each of the imaging stations 202-208 includes a three-dimensional (3D) image sensor that provides depth data and a separate two-dimensional (2D) image sensor that provides color data. In such instances, the 2D image sensor is registered to the coordinate system of the partner 3D image sensor, or vice versa, such that the color data of each pixel is associated with the depth data of that pixel. While the image sensors 212-218 are described in examples as RGB-D sensors, the techniques herein may be implemented with any type of image sensor, whether still image camera or video capture device, whether 2D devices or 3D devices.

Each of the image sensors 212-218 is pointed toward a dimensioning (or imaging) area 220, such that each of the image sensors 212-218 generates color data and depth data representative of an object 224 moved into the dimensioning area 220 by an automated vehicle 222.

In the example of FIG. 2, the automated vehicle 222 is an automated pallet mover controlled by the transportation controller 124 of FIG. 1. The object 224 may be a package to be dimensioned by the dimensioning stage 200. For example, the dimensioning stage manager 110 of FIG. 1 may send an instruction to the automated vehicle 222 to switch from a normal operating mode to a dimensioning mode, where the vehicle 222 is instructed to move into the dimensioning area 220. The dimensioning stage manager 110 may send further dimensioning stage instructions that instruct the vehicle 222 to enter the dimensioning area 220 via a first direction 226 or via a second direction 228. The dimensioning stage instructions may include the direction of entry into the dimensioning stage 200, the direction of exit from the dimensioning stage 200, as well as instructions on how the automated vehicle 222 is to move within the dimensioning area 220 to facilitate proper image capture. The dimensioning stage instructions may be based on the configuration of the dimensioning stage 200, and in particular, the number of image sensors and their position and orientation, which information may be stored by the dimensioning stage manager 110. The dimensioning stage instructions may also be based on object information for the object 224 carried on the automated vehicle 222. The object information may be stored by the transportation controller 124, the dimensioning stage manager 110, or another system, such as the target sensing system controller 152.

As described in detail below in connection with FIG. 3, the dimensioning stage manager 110 includes a freight dimensioner that receives frames of image data from the images sensors 212-218 and analyses the frames to determine, for example, one or more dimensions of an object appearing in the frames. In the illustrated example of FIG. 2, the dimensioning stage manager 110 is implemented on a processing platform deployed at the dimensioning stage 200, but which may be deployed remotely to the stage 200 in other examples. The example dimensioning stage manager 110 disclosed herein may be implemented in any suitable processing platform, including, for example, a processing platform deployed on the automated vehicle 222 and/or an automated transportation system associated with the vehicle automated 222.

Figure 3:
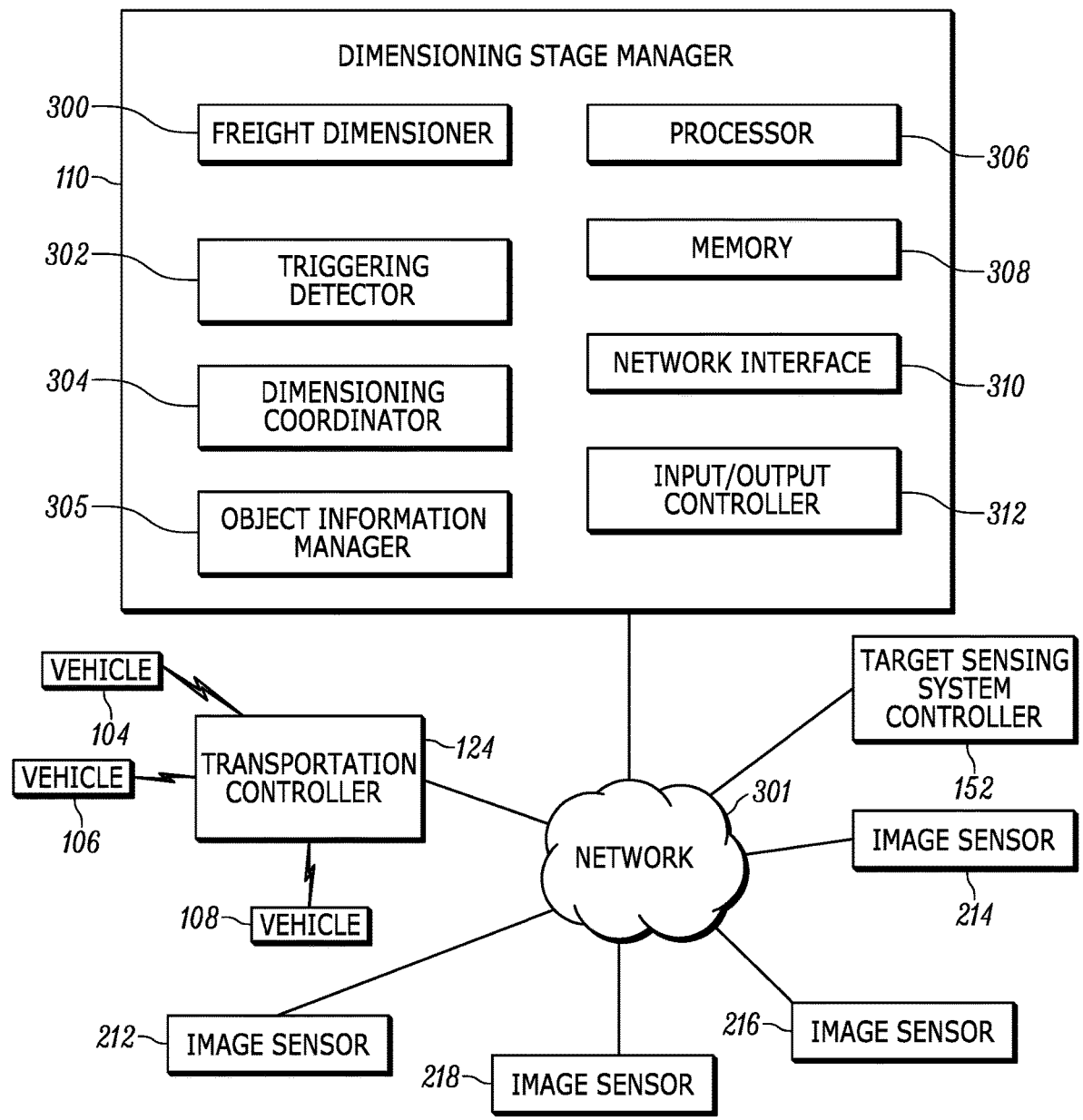
FIG. 3 is a block diagram representative of an example implementation of the dimensioning system of FIG. 2, capable of executing example operations described herein in FIGS. 4-9.

FIG. 3 is a block diagram illustrating an example implementation of the dimensioning stage manager 110 of FIGS. 1 and 2 in communication with the example transportation controller 124 of FIGS. 1 and/or 2. In the example of FIG. 3, the dimensioning stage manager 110 and, thus, a freight dimensioner 300, is in communication with the image sensors 212-218 of the dimensioning stage 200 through a network 301. The network 301 may be a wired or wireless network. Alternatively, the image sensors 212-218 may be in direct communication with the dimensioning stage manager 110. The freight dimensioner 300 receives image data from the image sensors 212-218, such as point cloud image data representative of the object from images taken at one or more vantage points, and the freight dimensioner 300 processes that image data and determines one or more dimensions of the object.

In the example of FIG. 3, the dimensioning stage manager 110 is in communication with the transportation controller 124 through the network 301. The transportation controller 124 controls operation of the automated vehicles 104-108, communicating with the vehicles 104-108 using its own communication network, in the illustrated example.

To initiate dimensioning of freight, the dimensioning stage manager 110 sends an instruction to the transportation controller 124 identifying a particular automated vehicle 104-108 that is to be moved into a dimensioning stage (e.g., one of the dimensioning stages 112-116 of FIG. 1). In the illustrated example, a trigger detector 302 initiates dimensioning by determining when a triggering event has occurred. For example, a triggering event may be when a timer (not shown) in the dimensioning stage manager 110 reaches a predetermined time indicating that dimensioning is scheduled for one or more of the automated vehicles 104-108. The triggering event may be when the trigger detector 302 determines that another triggering condition has been met, such as, when the dimensioning stage manager 110 receives vehicle position information from the transportation controller 124, where that position information indicates that the automated vehicle is within a given proximity to the dimensioning stage. After the trigger detector 302 identifies the presence or occurrence of a triggering condition, the trigger detector 302 generates a dimensioning mode request signal that the freight dimensioner 300 sends to the transportation controller 124 through the network 301 via a network interface 310.

The dimensioning stage manager 110 further includes a dimensioning coordinator 304 that generates instructions for dimensioning of freight. In some examples, the instructions generated by the dimensioning coordinator 304 are for movement of the automated vehicle within the dimensioning stage. In some examples, the instructions generated by the dimensioning coordinator 304 are for movement of one or more of the image sensors 212-218 in the dimensioning stage.

During imaging of the object 224, the image sensors 212-218 collect and transmit image data to the dimensioning stage manager 110. By way of example, the dimensioning stage manager 110 may be implemented as, for example, a logic circuit capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example dimensioning stage manager 110 further includes an object information manager 305 that generates object information and sends that object information to the dimensioning coordinator 304 for use in generating the dimensioning stage instructions. In some examples, the object information manager 305 communicates with the target sensing system controller 152 via the network 301. The target sensing system controller 152 identifies the object 224, for example, by identifying an RFID tag 224A associated with the object 224. The target sensing system controller 152 communicates an object identification to the object information manager 305, which then determines object information, such as the shape of the object 224, the weight of the object 224, one or more dimensions of the object 224, object type. The dimensioning coordinator 304 uses this object information to determine dimensioning stage instructions, and, in this way, object information is used to coordinate operation of the automated vehicle 222 and the image sensors 212-218.

The example dimensioning stage manager 110 includes a processor 306 such as, for example, one or more microprocessors, controllers, and/or any suitable type of processor. The example dimensioning stage manager 110 includes memory (e.g., volatile memory, non-volatile memory) 308 accessible by the processor 306 (e.g., via a memory controller). The memory 308 may represent one or more memories. The example processor 306 interacts with the memory 308 to obtain, for example, machine-readable instructions stored in the memory 308 corresponding to, for example, the operations represented by the flowcharts of this disclosure and other processes described herein. Additionally or alternatively, machine-readable instructions corresponding to the example operations of the flowcharts may be stored on one or more removable media (e.g., a compact disc, a digital versatile disc, removable flash memory, etc.) that may be in communication with a processing platform implementing the dimensioning stage manager 110 to provide access to the machine-readable instructions stored thereon. The memory may be accessible by any of the elements in the dimensioning stage manager 110.

As illustrated, the example dimensioning stage manager 110 includes the network interface 310 to communicate with, for example, the image stations 202-208, and more specifically to capture image data from the respective image sensors 212-218. In some examples, the network interface 310 may communicate with other machines via the network 301. The example network interface 310 includes any suitable type of communication interface(s) (e.g., wired and/or wireless interfaces) configured to operate in accordance with any suitable protocol(s).

The example dimensioning stage manager 110 of FIG. 3 further includes input/output (I/O) interfaces 312 to enable receipt of user input and communication of output data to the user.

Figure 4:
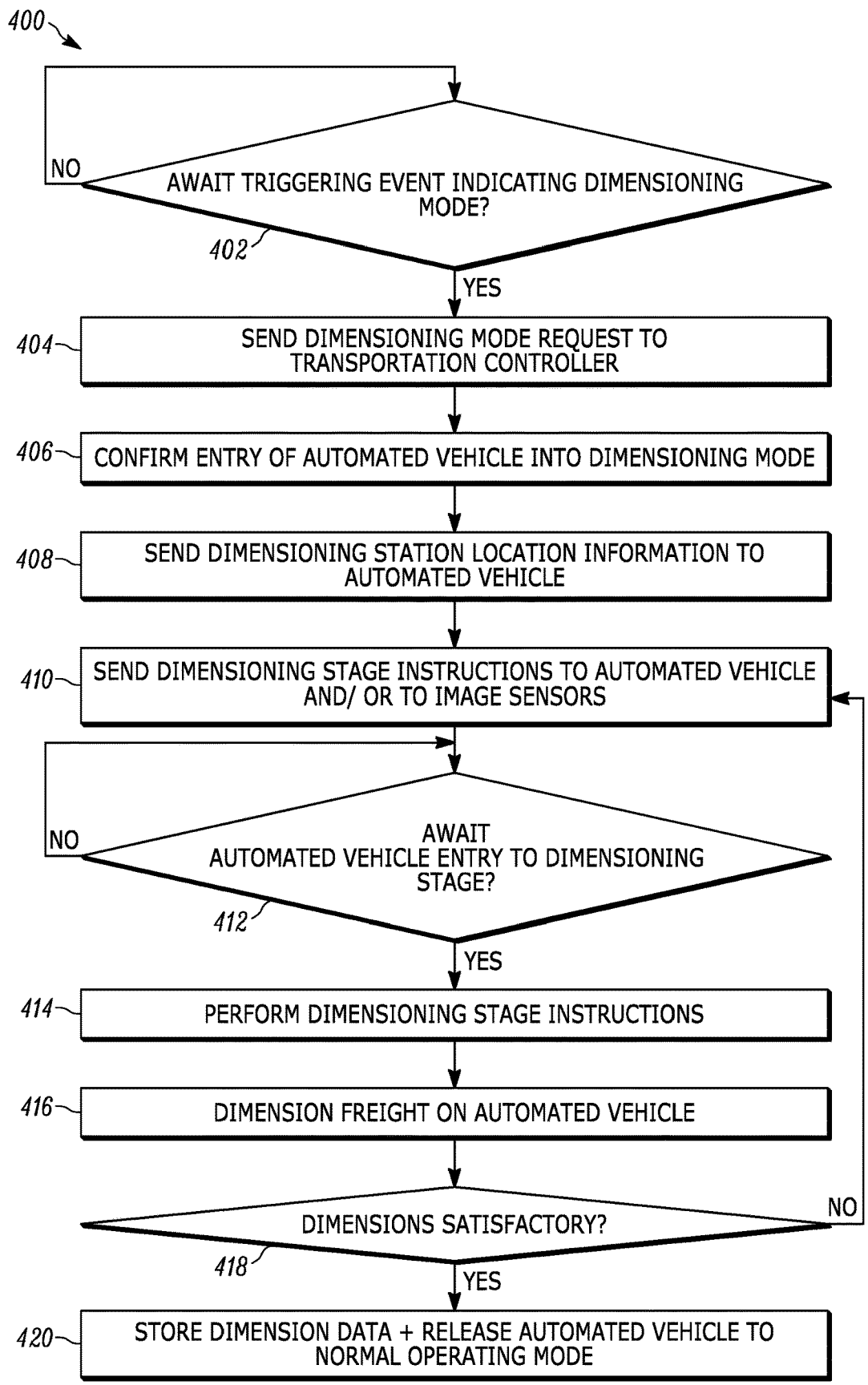
FIG. 4 is a flowchart representative of an example process that may be executed by the example dimensioning system of FIGS. 2 and/or 3.

FIG. 4 is flowchart representative of example operations capable of implementing the example dimensioning stage manager 110 of FIGS. 1, 2 and/or 3. For a process 400, at a block 402, the trigger detector 302 awaits a triggering event indicating that one or more automated vehicles is to enter a dimensioning mode, from a normal operating mode. In response to the trigger detector 302 identifying a trigger, the dimensioning stage manager 110 sends a dimensioning mode request to the transportation controller 124 (block 404) and awaits receipt of a confirmation signal from the transportation controller 124 (block 406), the confirmation signal to confirm that the one or more automated vehicles have entered the dimensioning mode. In example embodiments, the automated vehicles to enter the dimensioning mode are identified by the dimensioning stage manager 110, for example, based on scheduled triggers. In some example embodiments, the dimensioning stage manager 110 sends the dimensioning mode request and triggering event data to the transportation controller 124, which identifies the automated vehicles to enter the dimensioning mode.

In the example process of FIG. 4, after receipt of the confirmation signal (block 406), the dimensioning stage manager 110 sends dimensioning stage location information to the automated vehicle(s) (e.g., via the transportation controller 124 (block 408), instructing the automated vehicle which dimensioning stage to navigate to for dimensioning. At a block 410, the dimensioning stage manager 110 sends dimensioning stage instructions (e.g., instructions generated by the dimensioning coordinator 304) to the automated vehicle, the instructions indicating movement instructions for the automated vehicle to perform for completing dimensioning at the assigned dimensioning stage and/or instructions to the image sensors of the dimensioning stage to coordinate operation of the automated vehicle and the image sensors, when obtaining images for dimensioning.

The process 400 awaits the automated vehicle entry into the assigned dimensioning stage (block 412), at which point the dimensioning stage instructions are performed (block 414) and the dimensions of the freight on the automated vehicle are determined (block 416). In the illustrated example, the process 400 further includes a block 418 that determines if the dimension data is satisfactory. For example, if dimensions (e.g., length, width, and height) of an object were scanned or input to a system prior to entry into a dimensioning mode, such as dimensions provided by a customer on a bill of lading or shipping container, then the block 418 may compare the dimensions determined from process 400 to these pre-established dimensions. In another example, the dimensioning stage may be rated as having maximum dimensions (e.g., length, width, and/or height) that it is able to dimension, such that the block 418 examines whether any of the dimensions determined by the process 400 is greater than the corresponding maximum dimension, where if so the dimension data is determined as unsatisfactory for that dimension. If dimension data is not satisfactory, control is passed to block 410 for determining if the dimension stage instructions should be updated and updating those instructions and resending them to the automated vehicle for performing the dimensioning process again. Once the dimension data is satisfactory, control is passed to a block 420 for storing the dimension data and sending a release instruction to the automated vehicle, releasing the vehicle from the dimensioning mode and returning the vehicle to the control of the automated transportation system controller.

Figure 5:
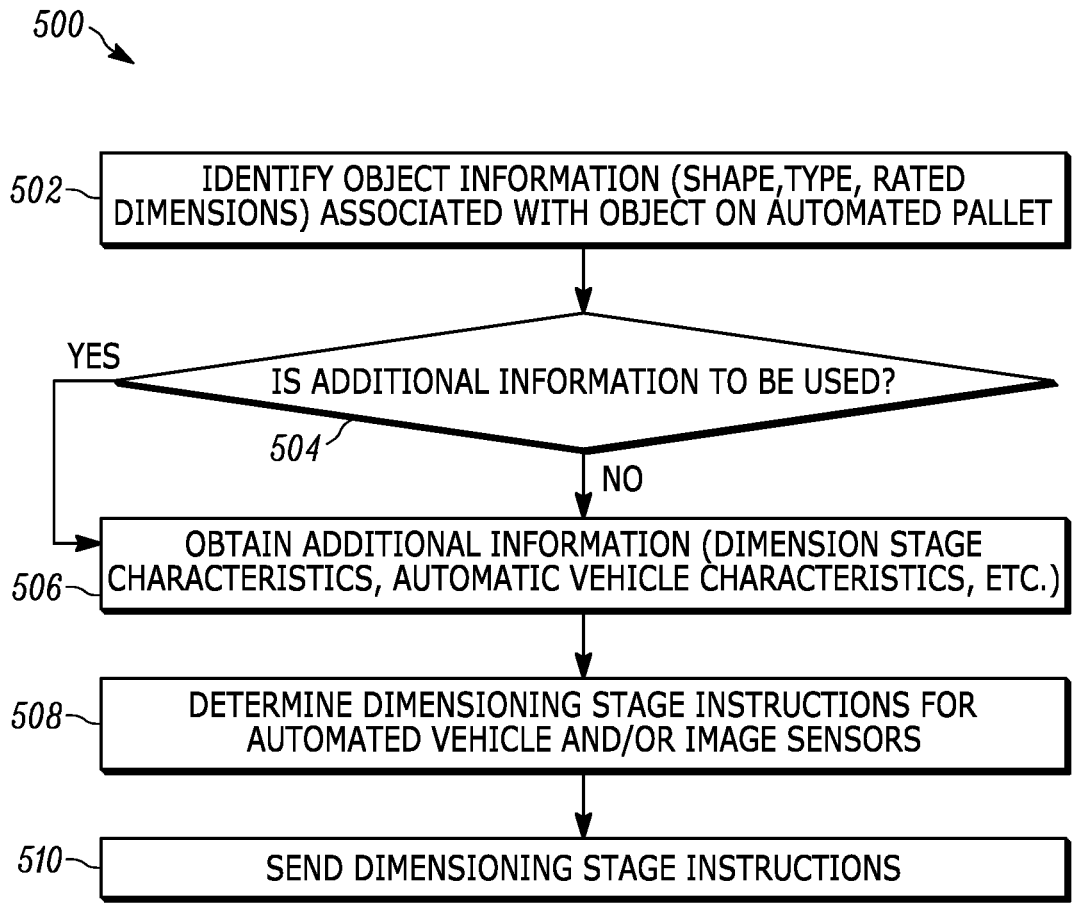
FIG. 5 is a flowchart representative of an example process to determine dimensioning instructions, as may be executed by the example process of FIG. 4.

FIG. 5 is flowchart representative of example operations capable of implementing the determination of dimensioning stage instructions as may be performed by the block 410 of FIG. 4. A process 500 includes identifying object information (block 502) associated with one or more objects on an automated vehicle, i.e., an automated pallet in the described example. The object information may be obtained using a target sensing system (e.g., the target sensing system controller 152 of FIG. 1) that includes a plurality of radio frequency identification (RFID) readers (e.g., the RFID readers 150 of FIG. 1) positioned throughout an environment and configured to detect an RFID tag associated with objects on an automated vehicle as the automated vehicle moves throughout the environment. In some examples, one or more readers are positioned at each dimensioning stage to identify the objects at the dimensioning stage. The object information may include a pre-stored shape of the objects, pre-stored dimensions for the object, the type of object, the weight of the object, whether the object is too large for dimensioning from one single set of image captures and instead will require multiple image captures as the object moves through a dimensioning stage, and any other suitable information on the object. Optionally, at a block 504, the process 500 determines if additional information is available and is to be used in determining operation of an automated vehicle and obtains that additional information (block 506). Additional information includes, for example, information on the type of dimensioning stage, the location of its image sensors, whether the direction of those image sensors can be computer controlled, etc. Other information may also include information on the automatic vehicles, such as the type of automatic vehicle, the height of the freight carrying platform, whether the automatic vehicle can be made to move only in linear directions or whether they have degrees of freedom to move in any two dimensional direction, etc. With the object information identified and optionally with additional information obtained, the dimensioning coordinator 304 generates instructions (block 508). These dimensioning stage instructions may include instructions for the automated vehicle, such as ingress instructions that indicate the direction along which an automated vehicle is to enter the dimensioning stage. The dimensioning stage instructions may include instructions on the direction of egress of the automated vehicle, as well as instructions on how the automated vehicle is to move within a dimensioning area of the dimensioning stage, such as whether the automated vehicle is to rotate or move, and long which path. These dimensioning stage instructions may be stored in a database that stores different automated vehicle movements for different object information and/or for different additional information, meaning the database may be multi-dimensional database or table that stores different movements for different combinations of objects, dimensioning stages, and automated vehicles.

In some examples, the dimensioning stage instructions include instructions to be executed by image stations (e.g., image sensors) during image capture. Like the movement instructions for automated vehicles, image station instructions may be stored in a database or table. These image station instructions are coordinated with the operation and movement of the automated vehicle.

With the dimensioning stage instructions determined, the instructions are communicated (510) by the dimensioning stage manager 110 to the image stations and/or to the transportation controller 124 to control operation of the image stations and/or movement of the automated vehicle for dimensioning the object.

The dimensioning stage instructions, for example, may include dimensioning process to be performed. For example, the instructions can cause the automated vehicle to move to a first position relative to the image sensor, after which the instructions cause the image sensor to perform an image capture operation while the vehicle is in the first position. From there, the instructions may further instruct the vehicle to move to a second position, after which the image sensor is to perform a second image capture operation. This coordinated procedure can be repeated until sufficient images have been captured for dimensions to be determined by the freight dimensioner. In some of these examples, the first and second image captures operations are the same. In some examples, they are different.

FIGS. 6-9 illustrate portions of different dimensioning stage configurations, in accordance with example embodiments herein.

Figure 6:
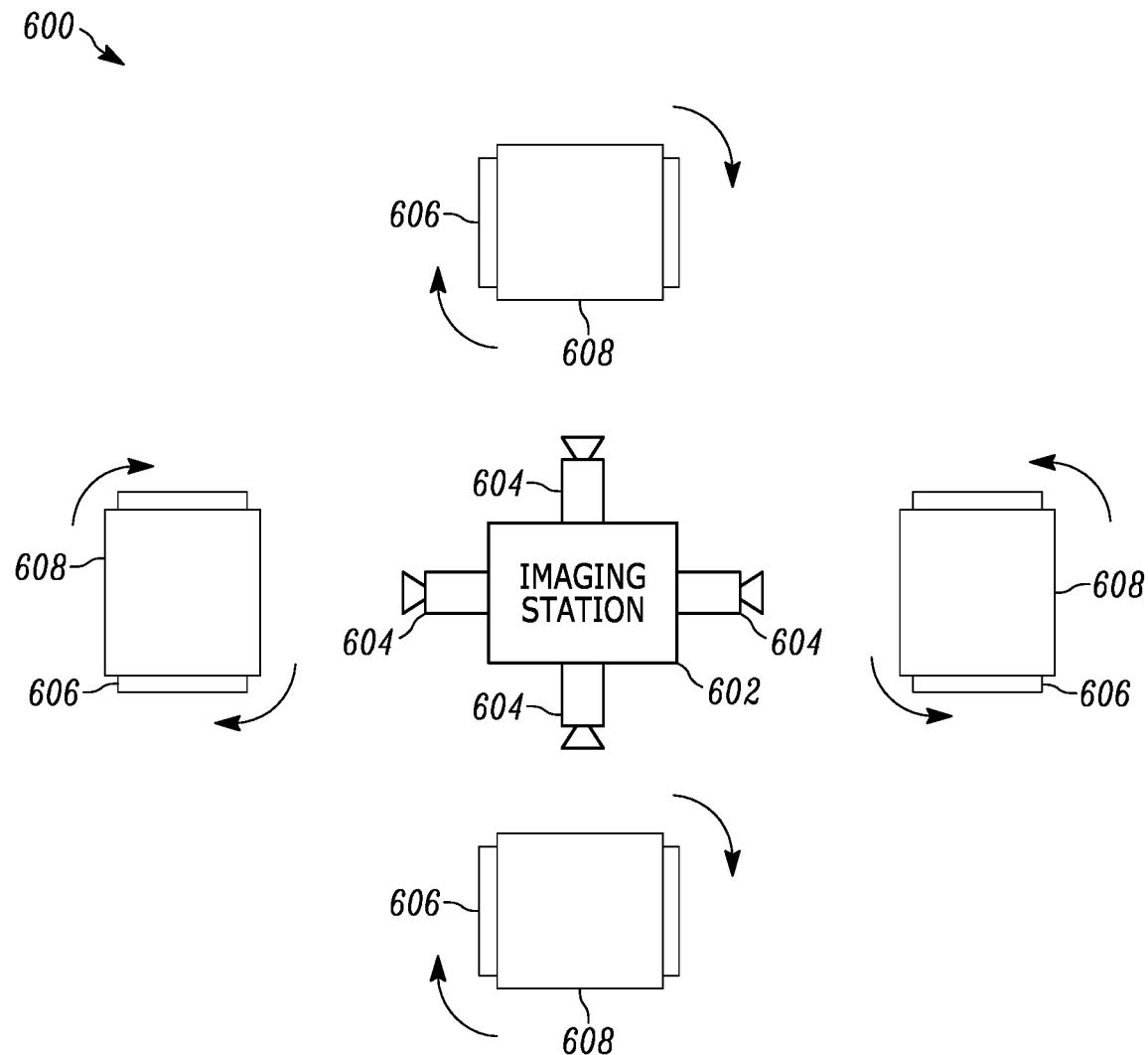
FIG. 6 is a block diagram of an example dimensioning stage in accordance with teachings of this disclosure.

FIG. 6 illustrates a dimensioning stage 600 having a single imaging station 602 with multiple image sensors 604. The dimensioning stage instructions for this dimensioning stage 600 may include instructions that an automated vehicle 606 (e.g., an automated pallet) carrying an object 608, is to rotate 360° in front of a respective image sensor 604. The image sensor 604 is instructed (e.g., by the dimensioning stage instructions) to capture images as the object is rotated in front of image sensor, for example, timing the image capture with the rotational position of the automated vehicle 606 based on the coordinated dimensioning stage instructions. The captured images are then processed by a freight dimensioner (not shown) to determine dimensions of the object, e.g., the height, width, and length of the object. In the illustrated example, four different automated vehicles 606 with objects 608 may be dimensioned simultaneously, with each of the image sensors 604 capturing image simultaneously but along individual directions.

Figure 7:
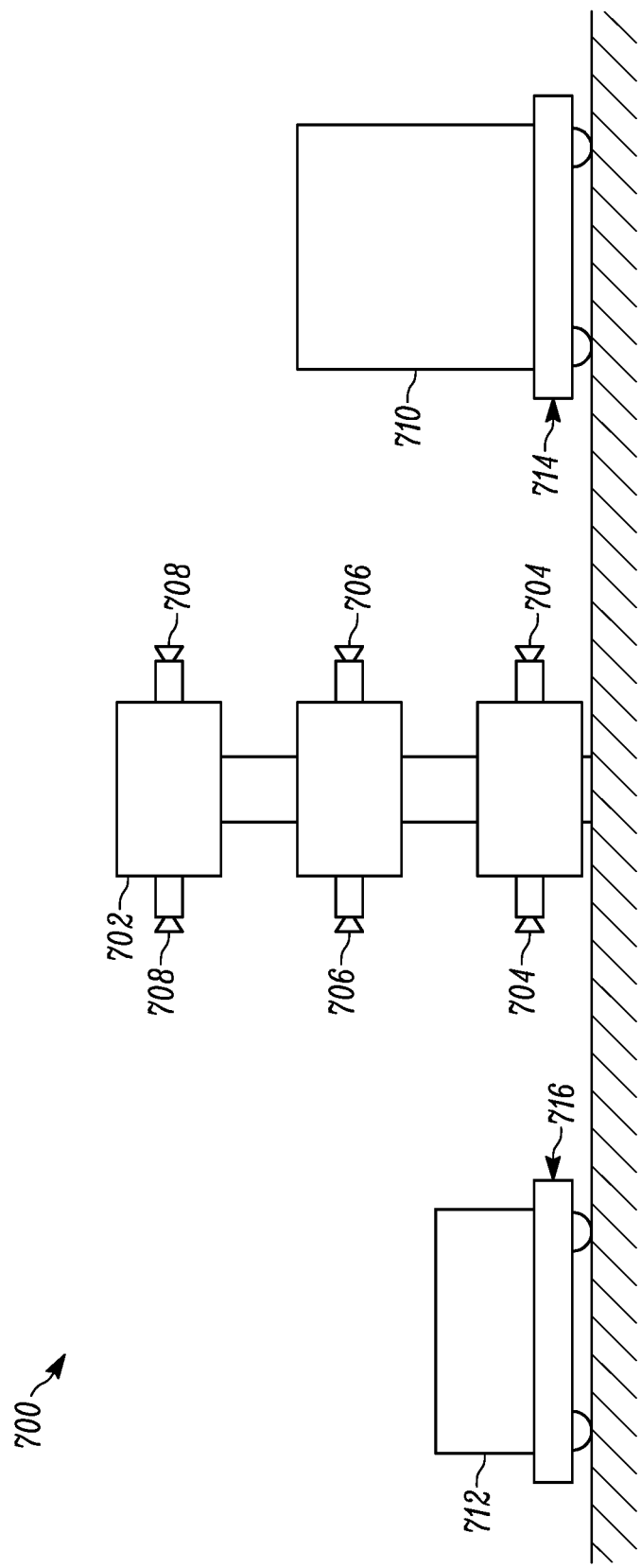
FIG. 7 is a block diagram of another example dimensioning stage in accordance with teachings of this disclosure.

FIG. 7 illustrates a dimensioning stage 700 with an imaging station 702 having image sensors 704, 706, and 708 positioned at different heights to capture images of objects 710 and 712 positioned at different heights on automated vehicles 714 and 716, respectively. In the illustrated example, two sets of orthogonally directed image sensors are provided for imaging and dimensioning two objects simultaneously. It is noted that in other examples, the imaging station 702 could have one or four or some other number of sets of image sensors. In the examples of FIGS. 6 and 7 the image stations are mounted to the ground of a dimensioning stage.

Figure 8:
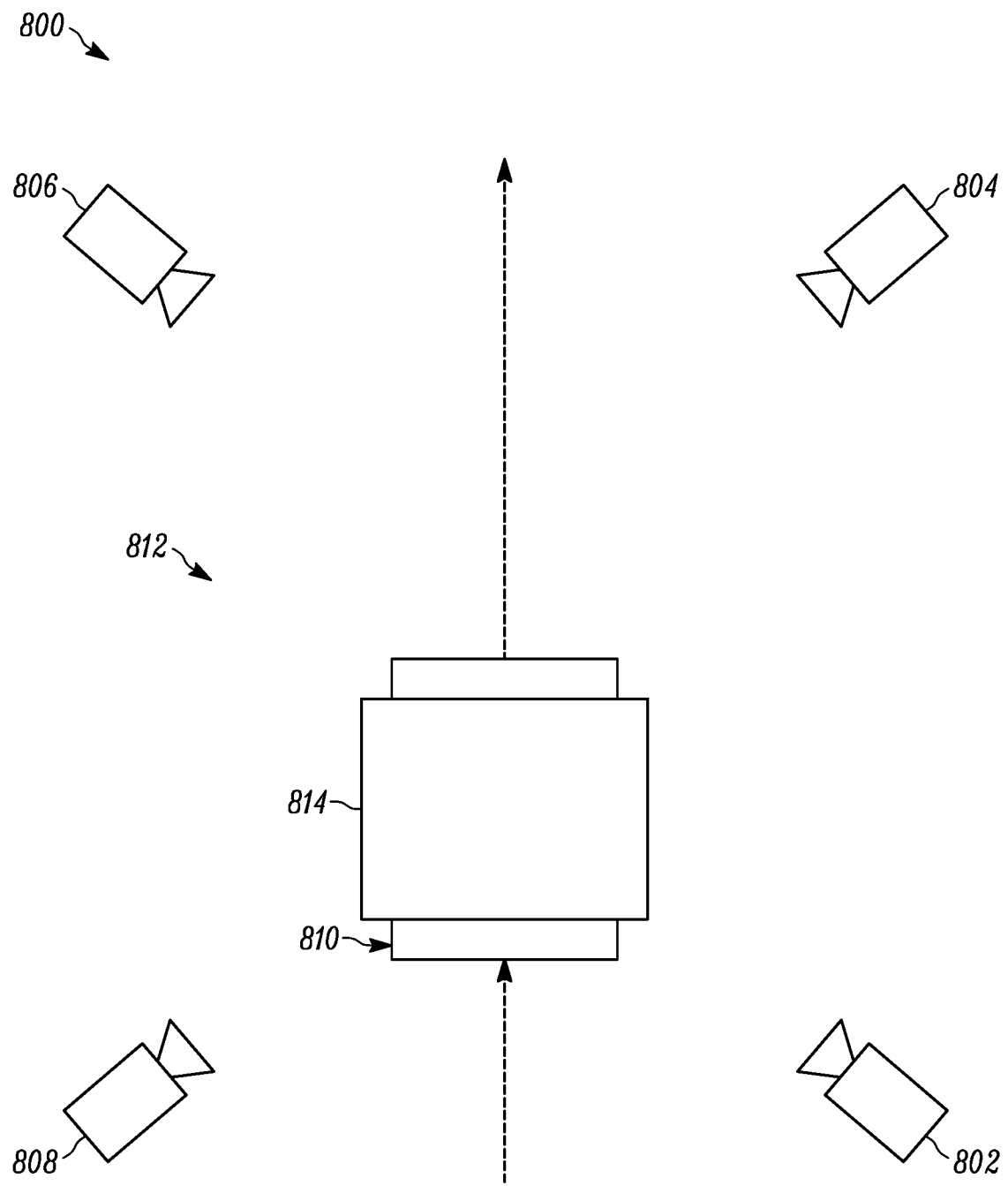
FIG. 8 is a block diagram of another example dimensioning stage in accordance with teachings of this disclosure.

FIG. 8 illustrates a dimensioning stage 800 with a plurality of separately positioned image stations 802, 804, 806, and 808, similar to that of FIG. 2, but with the image stations mounted to the ground of the dimensioning stage 800. An automated vehicle 810 is shown within a dimensioning area 812 and carrying object 814. Dimensioning stage instructions (generated by the dimensioning coordinator 304) indicate a linear path of the movement of the automated vehicle 810 through the dimensioning stage 800 to achieve proper dimensioning.

Figure 9:
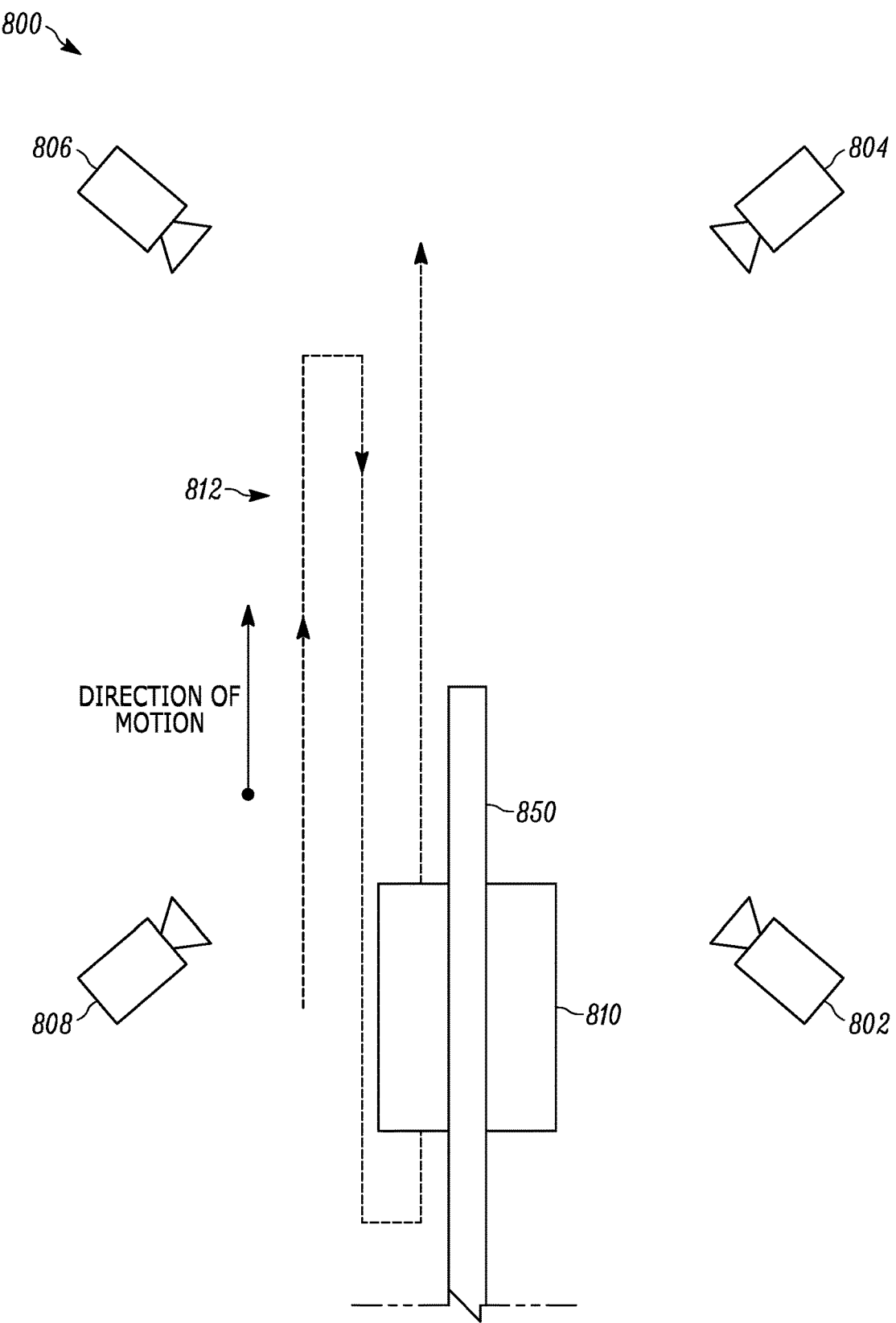
FIG. 9 is a block diagram of another example dimensioning stage in accordance with teachings of this disclosure.

FIG. 9 illustrates the dimensioning stage 800 which is the same as that of FIG. 8, but which shows an object 850 that is too large to be dimensioned from a single pass through the dimensioning stage 800. Instead, the object 850 is to be moved on a repeated back and forth path by the automated vehicle, until a sufficient number of images can be captured for the object to be dimensioned. That is, in the illustrated example the dimensioning coordinator 304 has determined, based on object information, that a back and forth path is needed to properly dimension the entire object 850.

Figure 10:
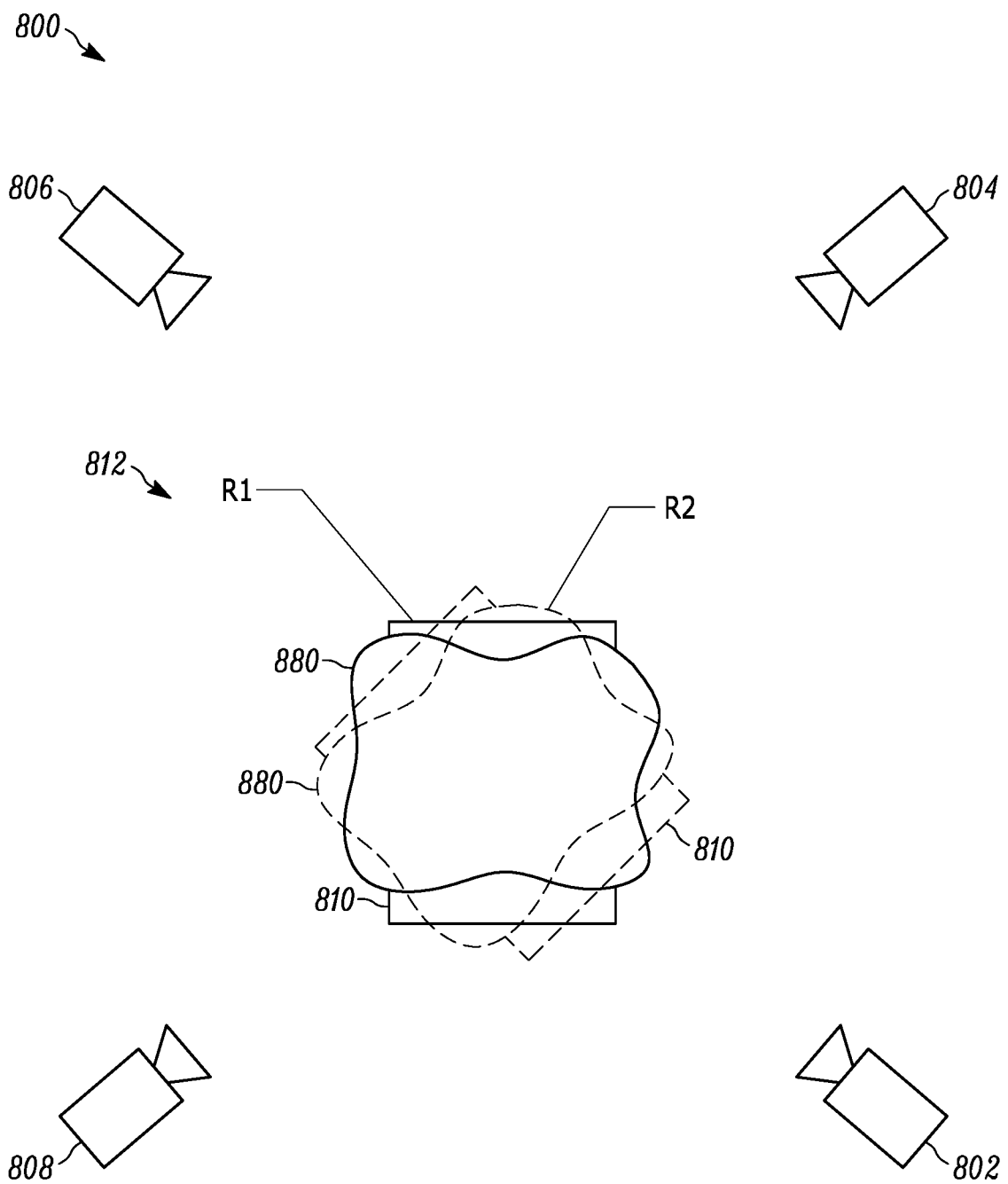
FIG. 10 is a block diagram of another example dimensioning stage in accordance with teachings of this disclosure.

FIG. 10 illustrates the dimensioning stage 800 which is the same as that of FIG. 8, but which shows an object 880 that has a complex geometry. In this example, the dimensioning coordinator 304 has determined, from object information, that the object 880 has one or more complex geometric surfaces that require the object 880 be rotated to properly dimension the entire object 880. That is, whereas the object 850 had a relatively standard shape, but was too long to image without using a back and forth linear path, the object 880 has a complex geometry (e.g., as identified in the object information) that results in having the automated vehicle 810 rotate in one or more directions as part of the dimensioning process. Such rotation allows the image stations 802, 804, 806, and 808 to capture a sufficient number of images and from sufficient angles to properly dimension the complex geometry. In the illustrated example, the rotational path shown has rotated the object 880 and the automated vehicle 810 between two different rotated positions, R1 and R2.

FIG. 10 illustrates an example dimensioning path of an example complex surface object, where the object has a complex surface geometry. An object with complex surface geometries may have many different forms. For example, an object with complex surfaces may have a high number of planar surfaces, higher than a rectangular cuboid; or the object may have planar surfaces that do not connect at right angles. An example would be an object of many different facets. In another example, an object with complex surfaces may have both curved and planar surfaces. These are examples of complex surfaces where the geometry of the surface(s) is complex. Complex surfaces may further refer to surfaces where the properties of the surface are complex, such as where the reflective properties of one or more surfaces are complex. An example of complex surface property would be an object that has one or more darkened surfaces that do not reflect incident radiation as well as the other surfaces. Or, an object could have one or more highly reflective surfaces. Such complex surface properties could result from the coating used on a surface, the paint used on a surface, the geometry of that surface, or other factors. In these examples, the complex surface reflectance properties could affect successful dimensioning of the object, unless these complex surface properties are taken into account and used to determine the dimensioning path of the automated vehicle.

To identify an object has having complex surfaces, the stored object information may include a particular identifier data field. In some examples, that identifier data field identifies the object as having complex surfaces or not having complex surfaces. In other examples, the identified data field identifies a type or a level of complexity of the complex surfaces, whether geometry-based or properties-based. In such examples, the type or level may be used by the dimensioning coordinator 304 to tailor the movement path the automated vehicle is to take during dimensioning. Furthermore, the dimensioning coordinator 304 may instruct one or more of the image stations 802, 804, 806, and 808 to zoom in or zoom out when capturing images. Such zoom control may be based on the complex surfaces of the object 880 in view of an image station. For example, as the automated vehicle 810 rotates the object 880, different surfaces will be in view of different image stations; and, as a result, the dimensioning coordinator 304 may instruct that an image station zoom in before capturing an image of the object, for example.

Figure 11:
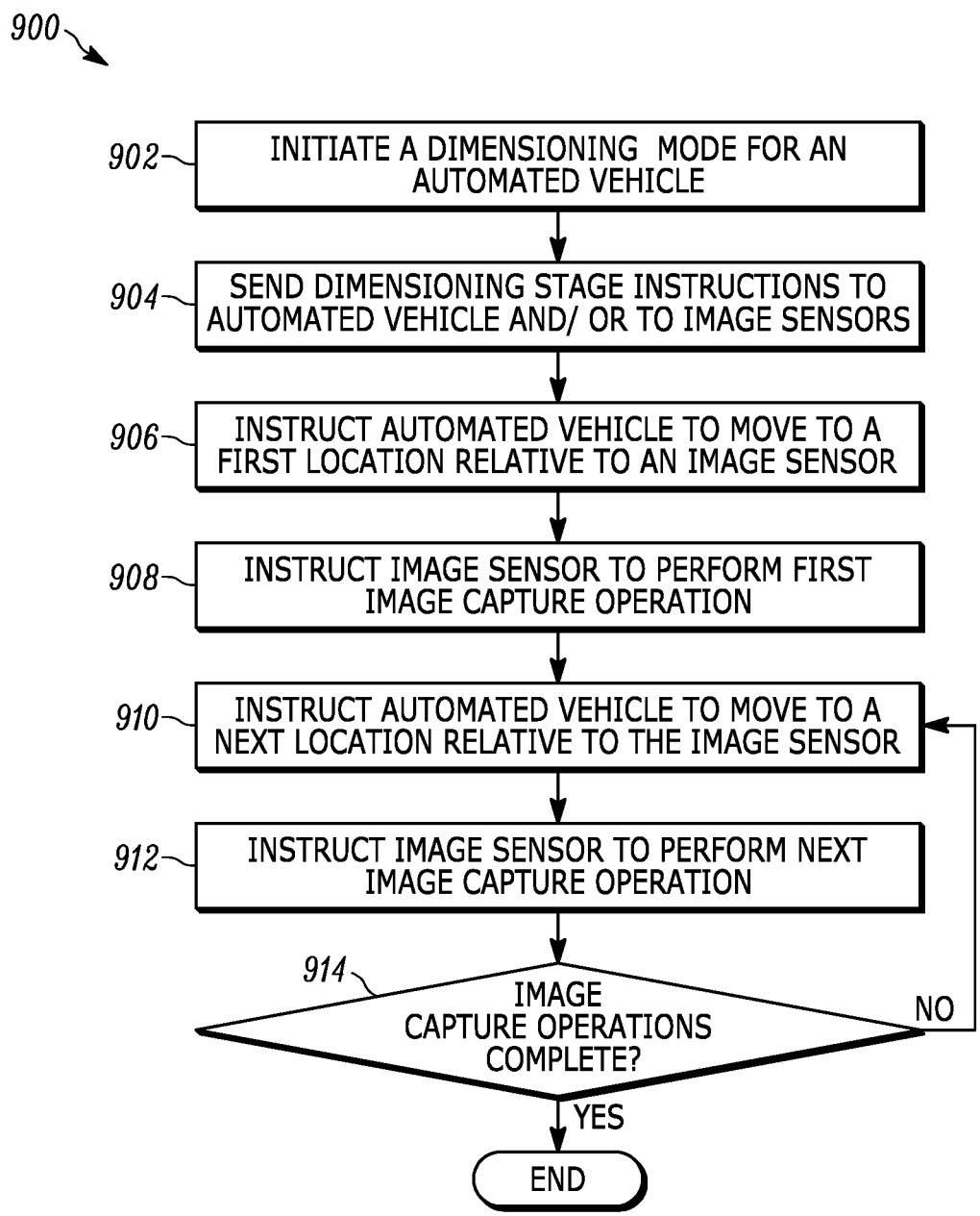
FIG. 11 illustrates an example coordination between an automated vehicle and an image sensor, in accordance with the teachings of this disclosure.

FIG. 11 illustrates an example process 900 of an example coordination between an automated vehicle and an image sensor, as may be achieved under the control of a dimensioning stage manager, and in particular a dimensioning coordinator, such as the dimensioning coordinator 304. At a block 902 a dimensioning mode is initiated for an automated vehicle, such as automated vehicle 222. That initiation may correspond to the operations of the blocks 402-408 described in the process 400, for example. In a similar manner to the operations of the block 410, at a block 904, a dimensioning coordinator sends dimensioning stage instructions to the automated vehicle and/or to one or more image sensors of the dimensioning stage. These dimensioning stage instructions are executed in blocks 906-914. For example, at the block 906, the dimensioning stage manager, and more specifically the dimensioning coordinator through an input/output controller, sends an instruction to the automated vehicle to move to a first location relative to an image sensor. That instruction is communicated to a transportation controller through a network, such as to the transportation controller 124 through the network 301. At the block 908, the process 900 waits for the automated vehicle to complete the instruction (e.g., the transportation controller may send a location confirmation signal to the dimensioning coordinator). After completion, at the block 910 the image sensor is instructed to perform a first image capture operation. That instruction may include instructions to move the image sensor, such as instructions to tilt, pan, or rotate the image sensor. Further that instruction will include an instruction to capture an image of an object on the automated vehicle. Confirmation of the capture of the image may be communicated by the image sensor to the dimensioning coordinator. Next, at the block 910, the dimensioning coordinator sends a new instruction for the automated vehicle to move to a next location relative to the image sensor, after which, in response to the updated location confirmation, the dimensioning coordinator instructs the image sensor to perform a next image capture operation (912), such as another movement of the image sensor and capturing of an image of the object, this time at a new position relative to the image sensor. This coordination of movement between the automated vehicle and the image sensor will continue until all image capture operations of the dimensioning coordinator are completed, and the process ends at the block 914.

Thus, examples herein provide for techniques for dimensioning one or more objects carried by automated vehicle, such as a driverless or autonomous vehicle or automated pallet mover. The techniques, which may be implemented on one or more controllers, allow a dimensioning system in a venue such as a warehouse or shipping facility to assume control over the movement of the automated vehicle in order to the move the automated vehicle into position for dimensioning and to control movement of the automated vehicle and to control operation of image sensors during an image capture process used to collect image data that is analyzed to determine the dimensions of the object. The techniques may be implemented on numerous objects simultaneously, whether by dimensioning the objects on different automated vehicles at the same time or whether by dimensioning multiple objects on a single automated vehicle.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed:

1. A system for dimensioning an object carried by an automated vehicle, the system comprising:
    an image sensor configured to capture image data representative of a dimensioning area; and
    a dimensioning stage manager having a processor and a memory, the dimensioning stage manager remotely located from an automated transportation system capable of moving the automated vehicle according to computer-readable instructions,
    the dimensioning stage manager configured to detect a dimensioning trigger condition associated with the automated vehicle,
    the dimensioning stage manager configured, in response to the dimensioning trigger condition occurring, to send a first instruction to the automated transportation system to move the automated vehicle to the dimensioning area,
    the dimensioning stage manager having a dimensioning coordinator configured to, in response to the automated vehicle entering the dimensioning area:
        identify object information associated with the object carried by the automated vehicle;
        determine a second instruction based on the object information, the second instruction to coordinate movement of the automated vehicle in the dimensioning area with an image capture operation of the image sensor.

2. The system of claim 1, wherein the dimensioning stage manager is configured to determine a shape of the object to identify the object information; and
    wherein coordinating the movement of the automated vehicle in the dimensioning area with the image capture operation of the image sensor includes sending the second instruction to the image sensor.

3. The system of claim 2, wherein the second instruction is to control movement of the image sensor to perform during the image capture operation.

4. The system of claim 1, wherein the dimensioning stage manager is configured to determine a shape of the object to identify the object information; and
    wherein coordinating the movement of the automated vehicle in the dimensioning area with the image capture operation of the image sensor includes sending the second instruction to the automated transportation system to control movement of the automated vehicle to perform in conjunction with the image capture operation.

5. The system of claim 1, further comprising a target sensing system including a radio frequency identification (RFID) reader to detect an RFID tag associated with the object,
wherein the dimensioning stage manager is configured to obtain the object information associated with the object from the target sensing system; and
wherein coordinating the movement of the automated vehicle in the dimensioning area with the image capture operation of the image sensor includes sending the second instruction to the automated transportation system to control movement of the automated vehicle in conjunction with the image capture operation.

6. The system of claim 5, wherein the dimensioning stage manager is configured to obtain the object information and to determine whether the object information indicates that the object has one or more complex surfaces; and
when the object has one or more complex surfaces, the dimensioning coordinator is configured to determine the second instruction based on the object having the one or more complex surfaces.

7. The system of claim 1, wherein the dimension stage manager is configured to determine a time value as the dimensioning trigger condition.

8. The system of claim 1, wherein the dimension stage manager is configured to determine a location value as the dimensioning trigger condition.

9. A dimensioning stage controller comprising:
a processor and a memory;
the memory stores computer-readable instructions, that when executed cause the processor to:
detect a trigger condition associated with an automated vehicle or an object of interest carried on the automated vehicle;
in response to the trigger condition occurring, send a first instruction to an automated transportation system capable of moving the automated vehicle according to computer-readable instructions, the first instruction instructing the automated vehicle to move to a dimensioning area; and
in response to the automated vehicle entering the dimensioning area:
identify object information associated with the object carried by the automated vehicle;
determine a second instruction based on the object information, the second instruction to coordinate movement of the automated vehicle in the dimensioning area with an image capture operation of the image sensor to capture images of the object for dimensioning the object.

10. The dimensioning stage controller of claim 9, wherein the memory stores computer-readable instructions, that when executed cause the processor to:
determine a shape of the object to identify the object information;
and
send the second instruction to the image sensor for coordinating movement of the automated vehicle in the dimensioning area with the image capture operation of the image sensor.

11. The dimensioning stage controller of claim 10, wherein the second instruction is to control movement of the image sensor to perform during the image capture operation.

12. The dimensioning stage controller of claim 9, wherein the memory stores computer-readable instructions, that when executed cause the processor to:
determine a shape of the object to identify the object information;
and
send the second instruction to the automated transportation system to control movement of the automated vehicle in conjunction with the image capture operation.

13. The dimensioning stage controller of claim 9, wherein the memory stores computer-readable instructions, that when executed cause the processor to:
obtain the object information associated with the object from a target sensing system including a radio frequency identification (RFID) reader capable of detecting an RFID tag associated with the object;
and
send the second instruction to the automated transportation system to control movement of the automated vehicle in conjunction with the image capture operation.

14. The dimensioning stage controller of claim 13, wherein the memory stores computer-readable instructions, that when executed cause the processor to:
determine whether the object information indicates that the object has one or more complex surfaces; and
when the object has one or more complex surfaces, determine the second instruction based on the object having the one or more complex surfaces.

15. The dimensioning stage controller of claim 9, wherein the trigger condition is a time value or a location value.

16. A method of dimensioning an object carried by an automated vehicle, the method comprising:
in response to determining that an object carried by the automated vehicle is to be dimensioned by an image sensor, assuming control of movement of the automated vehicle at a processor remotely located from the automated vehicle;
identifying object information associated with the object carried by the automated vehicle;
determining an instruction based on the object information; and
coordinating, based on the instruction and using the processor remotely located from the vehicle, movement of the automated vehicle with image capture operations of the image sensor.

17. A method as defined in claim 16, wherein coordinating the movement of the automated vehicle with the image capture operations of the image sensor includes:
causing the automated vehicle to move to a first position relative to the image sensor;
causing the image sensor to perform a first one of the image capture operations while the vehicle is in the first position relative to the image sensor;
causing the automated vehicle to move to a second position relative to the image sensor, the second position different than the first position; and
causing the image sensor to perform a second one of the image capture operations while the automated vehicle is in the second position.

18. A method as defined in claim 17, wherein the first image capture operation is the same as the second image capture operation.

19. A method as defined in claim 17, wherein the first image capture operation is different than the second image capture operation.

20. A method as defined in claim 16, wherein assuming control of movement components of the automated vehicle includes changing a mode of the vehicle to a remotely-controlled mode.

21. A method as defined in claim 16, wherein determining that the object is to be dimensioned includes determining, using the processor, that the object is scheduled for dimensioning.

22. A method as defined in claim 16, wherein determining that the object is to be dimensioned includes determining, using the processor, that the vehicle is approaching a dimensioning area including the image sensor.

* * * * *